UNITED STATES PATENT OFFICE.

DENNIS C. GATELY, OF NEWTOWN, CONNECTICUT.

IMPROVEMENT IN MANUFACTURE OF INDIA-RUBBER BELTING.

Specification forming part of Letters Patent No. 26,264, dated November 29, 1859.

*To all whom it may concern:*

Be it known that I, DENNIS C. GATELY, of Newtown, in the county of Fairfield and State of Connecticut, have invented a new and useful Process of Making Belting or Banding, made in part or wholly of india-rubber or gutta-percha; and I do hereby declare that the following description forms a full and exact specification of the same, wherein I have set forth the nature and principles of my said invention, by which it may be distinguished from all others of a similar class, together with such parts as I claim and desire to have secured to me by Letters Patent.

I have heretofore made an improvement in machine belting or banding composed, either in part or wholly, of india-rubber or gutta-percha, which consists in giving the belt or band a smooth friction-surface, for which new belting or banding I have made a separate application for Letters Patent.

The present invention consists in a new mode of imparting a smooth and finished surface to the belt or band, for the purpose of producing the best friction-surface; and I will now proceed to describe the essential features of my new method of effecting the result, in detail.

I take a strip or sheet of rubber or gutta-percha, or of cloth covered with rubber or gutta-percha—the latter being the stronger and better—and vulcanize it. I prefer during this process of vulcanization to subject this strip to a higher degree of heat than usual—say about 280°—for reasons which will hereinafter appear. The belt or band, being then made up in any proper mode previous to vulcanization, is then rolled tightly up with the strip or sheet previously vulcanized, as hereinbefore explained, soapstone or black-lead or other similar substances being sprinkled upon the vulcanized strip or sheet or upon the belt, to prevent the belt or band and the strip or sheet from adhering to each other. The belt or band, while thus tightly wound up between the layers of the vulcanized strip or sheet, is then vulcanized by placing the whole in a steam heater, or by subjecting it to dry heat, or in any other proper manner. By thus compressing the belt or band during the curing process between the layers of the vulcanized strip or sheet the desired effect of imparting a smooth and finished friction-surface to the belt or band is successfully attained. The strip or sheet with which the belt or band is wound I prefer to subject to a somewhat greater degree of heat than is usual in the ordinary curing process, and a higher temperature than that to which the belt or band is to be exposed, which is about 10° or 20° less, so that when heated with the belt or band it shall not be liable to become sticky or tacky enough to adhere to the same.

It will be seen that the winding or rolling up of the belt can be effected either by hand or by machinery. The desired effect may be also produced by simply placing the belt or band in an extended position between straight strips or sheets of vulcanized india-rubber or gutta-percha, instead of rolling the strip or sheet and belt or band together. The smooth surface of the belt is produced by the smooth surface of the gutta-percha or rubber with which it is in contact while being vulcanized. If both surfaces of the belt are to be made smooth, both surfaces of the gutta-percha or rubber with which it comes in contact should be made smooth also.

Having thus described my improved process, I shall state my claim, as follows:

What I claim as my invention, and desire to secure by Letters Patent, is—

The method herein described of imparting a smooth and finished surface to belts or bands of india-rubber or gutta-percha, the same consisting in placing them in contact with sheets or strips of vulcanized india-rubber or gutta-percha, and then vulcanize them by applying heat, substantially in the manner and for the purposes set forth.

DENNIS C. GATELY.

Witnesses:
TIMOTHY CORNWELL,
S. D. BENNETT.